(12) United States Patent
Boeck et al.

(10) Patent No.: US 9,988,927 B2
(45) Date of Patent: Jun. 5, 2018

(54) HOUSING FOR A GAS TURBINE, AIRCRAFT ENGINE, AND A PROCESS FOR OPERATING A GAS TURBINE

(71) Applicant: MTU Aero Engines AG, Munich (DE)

(72) Inventors: Alexander Boeck, Kottgeisering (DE); Franz Malzacher, Groebenzell (DE)

(73) Assignee: MTU Aero Engines AG, Munich (DE)

( * ) Notice: Subject to any disclaimer, the term of this patent is extended or adjusted under 35 U.S.C. 154(b) by 351 days.

(21) Appl. No.: 14/812,204

(22) Filed: Jul. 29, 2015

(65) Prior Publication Data
US 2016/0032760 A1 Feb. 4, 2016

(30) Foreign Application Priority Data

Jul. 30, 2014 (DE) ........................ 10 2014 214 915

(51) Int. Cl.
*F01D 17/16* (2006.01)
*F01D 17/26* (2006.01)
(Continued)

(52) U.S. Cl.
CPC .............. *F01D 17/26* (2013.01); *F01D 9/04* (2013.01); *F01D 9/041* (2013.01); *F01D 17/10* (2013.01);
(Continued)

(58) Field of Classification Search
CPC ........ F01D 11/025; F01D 11/20; F01D 9/041; F01D 9/04; F01D 9/065; F01D 11/22; F01D 25/12
See application file for complete search history.

(56) References Cited

U.S. PATENT DOCUMENTS 2,919,890 A 1/1960 Smith et al.
4,385,864 A 5/1983 Zacherl
(Continued)

FOREIGN PATENT DOCUMENTS

DE 29 31 766 A1 2/1981
EP 1 111 196 A2 6/2001
(Continued)

OTHER PUBLICATIONS

European Search Report issued in European counterpart application No. 15176353.9-13-1610 dated Dec. 8, 2015, with Statement of Relevancy (Seven (7) pages).
(Continued)

*Primary Examiner* — Logan Kraft
*Assistant Examiner* — Sabbir Hasan
(74) *Attorney, Agent, or Firm* — Crowell & Moring LLP

(57) ABSTRACT

A housing for a gas turbine is disclosed. At least one wall element is housed on the housing so as to move, which limits a flow channel of the housing in the radial direction from a rotational axis of a rotor of the gas turbine toward the exterior. The housing includes at least one variably adjustable guide blade which extends through the wall element into the flow channel. The wall element can be moved between a sealing setting, in which the wall element makes contact at least in a partial area of a side of a blade leaf of the guide blade facing toward the wall element, and an open setting, in which the blade leaf and the wall element are spaced some distance apart from one another. A gas turbine as well as a process for operating a gas turbine is also disclosed.

14 Claims, 2 Drawing Sheets

(51) Int. Cl.
  *F01D 9/04* (2006.01)
  *F04D 29/56* (2006.01)
  *F04D 29/08* (2006.01)
  *F04D 29/16* (2006.01)
  *F01D 17/10* (2006.01)
  *F01D 25/16* (2006.01)
  *F01D 25/24* (2006.01)

(52) U.S. Cl.
  CPC ........... *F01D 17/162* (2013.01); *F01D 25/16* (2013.01); *F01D 25/24* (2013.01); *F04D 29/083* (2013.01); *F04D 29/161* (2013.01); *F04D 29/563* (2013.01); *F05D 2220/32* (2013.01); *F05D 2240/12* (2013.01); *F05D 2240/55* (2013.01); *F05D 2270/65* (2013.01); *Y02T 50/671* (2013.01)

(56) References Cited

U.S. PATENT DOCUMENTS

| | | | |
|---|---|---|---|
| 5,873,700 | A | 2/1999 | Ichikawa |
| 8,408,864 | B2 * | 4/2013 | Fintescu ................. F01D 9/065 137/512.1 |
| 2009/0074563 | A1 * | 3/2009 | McCaffrey .............. F01D 11/08 415/115 |

FOREIGN PATENT DOCUMENTS

EP    2 407 673 A1   1/2012
WO   WO 2007/045874 A1   4/2007

OTHER PUBLICATIONS

German-language Office Action dated Mar. 12, 2015 (Nine (9) pages).

* cited by examiner

HOUSING FOR A GAS TURBINE, AIRCRAFT ENGINE, AND A PROCESS FOR OPERATING A GAS TURBINE

This application claims the priority of German Patent Application No. DE 10 2014 214 915.0, filed Jul. 30, 2014, the disclosure of which is expressly incorporated by reference herein.

BACKGROUND AND SUMMARY OF THE INVENTION

The invention relates to a housing for a gas turbine. The invention further relates to a gas turbine as well as a process for operating a gas turbine.

Gas turbines with variably adjustable guide blades are known from the prior art. Typically, guide blades are rotatably housed in a housing of the gas turbine for adjustment, in which the blade leaves of the guide blades are arranged in a flow channel of the housing of the gas turbine. Variably adjustable guide blades in a gas turbine particularly enable the adjustment of the absorption capacity of a turbine as well as the selective adaptation of the flow to downstream rotors. A gas turbine can thereby be particularly well-adjusted for various operating points, which reduces fuel consumption.

U.S. Pat. No. 2,919,890 discloses, in addition to variably adjustable guide blades, a housing for a gas turbine comprising a plurality of wall elements, which are housed so as to move in the housing and are subjected to targeted force in a direction of the flow channel via a spring. Thereby, various thermal expansions of the various housing elements and the guide blades can be compensated for.

However, what is disadvantageous with the known housings is that a sufficiently large gap must always be provided between the blade leaves of the guide blades and the adjacent wall element in order to also ensure the adjustability of the guide blades, in addition to the tolerance compensation, during operation of the assigned gas turbine. This gap, which is also characterized as the flag gap, leads to so-called throttle losses. These throttle losses reduce the level of efficiency and cause an increased fuel consumption in the gas turbine. In the worst-case scenario, this increased fuel consumption can overcompensate for the reduction in fuel consumption that can be achieved from the variable adjustment and make the adjustability of the guide blade thus unnecessary.

The object of the present invention is to obtain a housing for a gas turbine, which, on one hand, enables reliable guide blade adjustment and, on the other hand, enables improved efficiency of an assigned gas turbine. Another object of the invention is to provide a gas turbine with such a housing as well as a process for operating a turbine having such a housing.

A first aspect of the invention relates to a housing for a gas turbine. In order to enable reliable guide blade adjustment, on one hand, and an improved level of efficiency of an assigned gas turbine, on the other hand, a provision according to the invention is that the wall element be movable between a sealing setting, in which the wall element makes contact at least at a partial area of a side of a blade leaf of the guide blade facing toward the wall element, and an open setting, in which the blade leaf and the wall element are spaced apart from one another. In other words, a provision according to the invention is that the wall element be movable into an open setting, on one hand, in which a sufficiently large gap is formed between the wall element and the blade leaf of the guide blade in order to adjust the guide blade. On the other hand, a provision is that the wall element be movable into a sealing setting, in which the side of the blade leaf of the guide blade facing toward the wall element makes contact with at least part of the wall element. In the sealing setting, the flag gap is thus partially, predominantly, or completely closed, whereby corresponding throttle losses are greatly reduced or completely prevented during operation of the assigned gas turbine. Thus, the level of efficiency of the assigned gas turbine is improved, on one hand, while the adjustability of the guide blade is further assured, on the other hand. Contrary to a wearing seal, which could be realized, for example, by means of brushes, slides, or the like, wear furthermore does not occur on the adjustable blade leaf or on the wall element. Therefore, the housing according to the invention is particularly low-maintenance. In addition, no structural or aerodynamic modification of the guide blade is necessary, which could influence its service life or the effect on the gas flow disadvantageously. The adjustable guide blade in this case can essentially be formed as a turbine guide blade or as a compressor guide blade. Furthermore, essentially multiple adjustable guide blades can be provided, which are arranged next to one another in the circumferential direction of the housing with respect to a guide blade ring. The adjustable guide blades in this case may also be combined into guide blade segments. Similarly, multiple adjustable wall elements, which may also be characterized as annular area segments, may be arranged next to one another in the circumferential direction of the housing into a complete ring radially adjacent to the flow channel toward the exterior.

In another advantageous embodiment of the invention, a provision is that the wall element be subjected to fluid under pressure in order to move between the open setting and the sealing setting. For this purpose, the wall element may border, for example, a hollow space subjected to pressure, together with further housing elements. Fluids under pressure can be created for gas turbines without special effort. For example, compressed air in the form of so-called bleed air from a compressor stage of the gas turbine can be drawn off as fluid. The drawing off of bleed air or compressed air from the compressor of gas turbines is known and already being provided with many aircraft engines. With the use of a gas turbine in an aircraft engine there is additionally a sufficient amount of air pressure in the form of dynamic pressure, starting at a certain speed of an airplane, helicopter, or the like. Accordingly, the wall element can be subjected to pressure in a particularly simple and particularly economical manner. The number of moving parts is especially low in this case, especially in contrast to the use of an actuator, for example. Thus, the housing and therefore also a gas turbine equipped with the housing can be particularly formed in a low-maintenance and easy manner. This is of particularly great significance in airplane construction. Alternatively, when using a hydraulic actuator, the hydraulic system typically already present on airplanes, for example, can be used.

It is particularly advantageous for the invention when the housing includes a pressure supply line for supplying the fluid under pressure and a pressure relief line for discharging the fluid under pressure. The pressure on the wall element can be increased accordingly by supplying the fluid under pressure via the pressure supply line, while the pressure on the wall element can be correspondingly reduced by draining the fluid via the pressure relief line. The pressure supply line can form, for example, a channel to one of the compressor stages of the gas turbine. Alternatively, the pressure supply line can form a channel to the environment of the gas turbine so that the wall element can be subjected to the ambient pressure. Alternatively, it is also possible, for example, for the pressure supply line to be a passageway opening in an aircraft engine, by which the wall element can be subjected to dynamic pressure generated by the movement of the airplane, helicopter, or the like. In an advantageous manner, increased pressure causes a movement of the wall element into the closed setting, so that the flag gap is by default at least for the most part closed during operation of an assigned gas turbine. The movement of the wall element into the open setting is effected in this case by a relative pressure reduction or by a draining off of the fluid under pressure. The pressure relief line can be routed, for example, into the environment. This movement can be supported by a pressure in the flow channel, which acts upon the wall element. However, it is also possible to reverse this effective principle, which means that a sufficient pressure increase effects a movement of the wall element into the open setting, while a pressure reduction effects a movement of the wall element into the sealing setting. Thus, the movement of the wall element between the sealing setting and the open setting can be effected with particularly technically simple and economical means.

In a further advantageous embodiment of the invention, a provision is that the pressure supply line and/or the pressure relief line include a valve, by which the pressure on the wall element can be controlled and/or regulated. This enables a particularly precise control and/or regulating of the movement of the wall element between the sealing setting and the open setting. The control or regulation of the valve can take place as a function of the operating parameters of the gas turbine. To this end, the valve can be coupled, for example, to a control and/or regulating mechanism of the gas turbine.

In a particularly advantageous embodiment of the invention, a provision is that a drain-off channel of the pressure relief line have a larger cross-section than an access channel of the pressure supply line. The larger cross-section of the drain-off channel enables a particularly quick pressure reduction and thus a particularly quick movement of the wall element between the open and the sealing setting. In addition, this hereby makes it possible to use only one valve on the pressure relief line and thus to keep the number of parts as well as the weight of the housing as low as possible. When the valve is open, more fluid can be discharged then can be simultaneously supplied via the pressure supply line due to the larger cross-section of the drain-off channel, whereby quick pressure reduction is achieved.

Furthermore, it has been shown to be advantageous when the wall element is retained on a housing element on one side by a bearing. The bearing reduces at least one of the degrees of freedom of the moving wall element. The wall element can be moved relative with respect to the adjacent housing element via the bearing and can be pivoted or bent, for example, between the sealing setting and the open setting.

In an especially advantageous embodiment of the invention, a provision is that at least one sealing element is arranged between the wall element and an adjacent housing element. This enables a reliable sealing of the gap between the wall element and the adjacent housing element. Such a gap may result particularly with a movement of the wall element between the sealing setting and the open setting. Pressure losses in the flow channel can be especially reliably prevented by the sealing element, which means that the efficiency of the gas turbine is increased independently of the setting of the wall element. The sealing element in this case can be arranged such that the wall element glides along the sealing element when there is movement between the sealing setting and the open setting. Alternatively, the sealing element can also be attached to the movable wall element and glide along on the other housing element.

Other advantages result in that a surface of the wall element adjoining the flow channel and a blade disk of the guide blade are at least essentially connected flush with one another in the sealing setting. The side of the blade disk facing toward the flow channel and the side of the wall element adjoining the flow channel thus form an essentially smooth surface, from an aerodynamic perspective. A particularly low amount of undesirable turbulence is thereby induced in the flow of gas at the transition between the blade disk and the wall element. A small gap in this case can essentially remain between the blade disk and the wall element.

In another advantageous embodiment of the invention, a provision is that the wall element includes an opening, in which the blade disk of the guide blade is arranged. In doing so, preferably a clearance fit is provided between the blade disk and the opening, so that the guide blade and the wall element are movable relatively with respect to one another. Thus, the wall element can serve as a guide for the adjustable guide blade. On the other hand, the guide disk can serve as a guide during adjustment of the wall element between the open and the sealing setting. In another advantageous embodiment of the invention, a provision is that the wall element and the guide blade be fastened to one another with friction contact in the sealing setting.

This means that the wall element exerts such normal force onto the side of the guide blade leaf placed into contact in the sealing setting that a relative movement of the guide blade is prevented, at least under normal operating conditions of an assigned gas turbine. This enables especially reliable, reversible positioning assurance of the guide blade, so that an additional setup to fasten the variably adjustable guide blade can even be advantageously omitted.

In another advantageous embodiment of the invention, a provision is that the housing includes at least one stop element, which limits the movement of the wall element into the sealing setting and/or into the open setting. The stop element or elements represent a constructively simple and operationally reliable option to limit the relative movement of the wall element, particularly swiveling, rotating, and/or bending opposite the adjoining housing elements. Thus, the housing elements adjoining the wall element are also particularly well-protected against damage caused by an unreliable movement of the wall element.

A second aspect of the invention relates to a gas turbine, particularly an aircraft engine, having a housing according to any of the preceding exemplary embodiments. The resulting features and the advantages thereof are contained in the descriptions of the first aspect of the invention, in which advantageous embodiments of the first aspect of the invention can be considered advantageous embodiments of the second aspect of the invention.

A third aspect of the invention relates to a process for operating a gas turbine having a housing according to the first aspect of the invention. In order to enable reliable guide blade adjustment, on one hand, and an improved level of efficiency of the gas turbine, on the other hand, a provision according to the invention is that the wall element be moved between the sealing setting and the open setting. The resulting features and the advantages thereof are contained in the descriptions of the first aspect of the invention, in which advantageous embodiments of the first aspect of the invention can be considered advantageous embodiments of the second aspect of the invention.

In an advantageous embodiment of the process, a provision is that the wall element be moved initially into the open setting. Thereby, the gap between the side of the blade leaf of the adjustable guide blade facing toward the wall element and the wall element is exposed. In a second step, the guide blade is then adjusted. Subsequently, the wall element is then moved back into the closed setting, whereby the flag gap between the wall element and the side of the blade leaf of the adjustable guide blade facing toward the wall element is at least predominantly again closed. Thus, it is particularly possible to move the wall element into the open position and to maintain it there merely so long as is necessary for the desired adjustment of the guide blade. Subsequently, the wall element can be moved directly back into the sealing setting in order to again at least essentially close the flag gap. Thus, throttle losses and therefore also the fuel consumption of the gas turbine can be advantageously minimized.

Additional advantages, features, and details of the invention result from the following description of the preferred exemplary embodiments as well as the drawings.

DETAILED DESCRIPTION OF THE DRAWINGS

Figure 1:
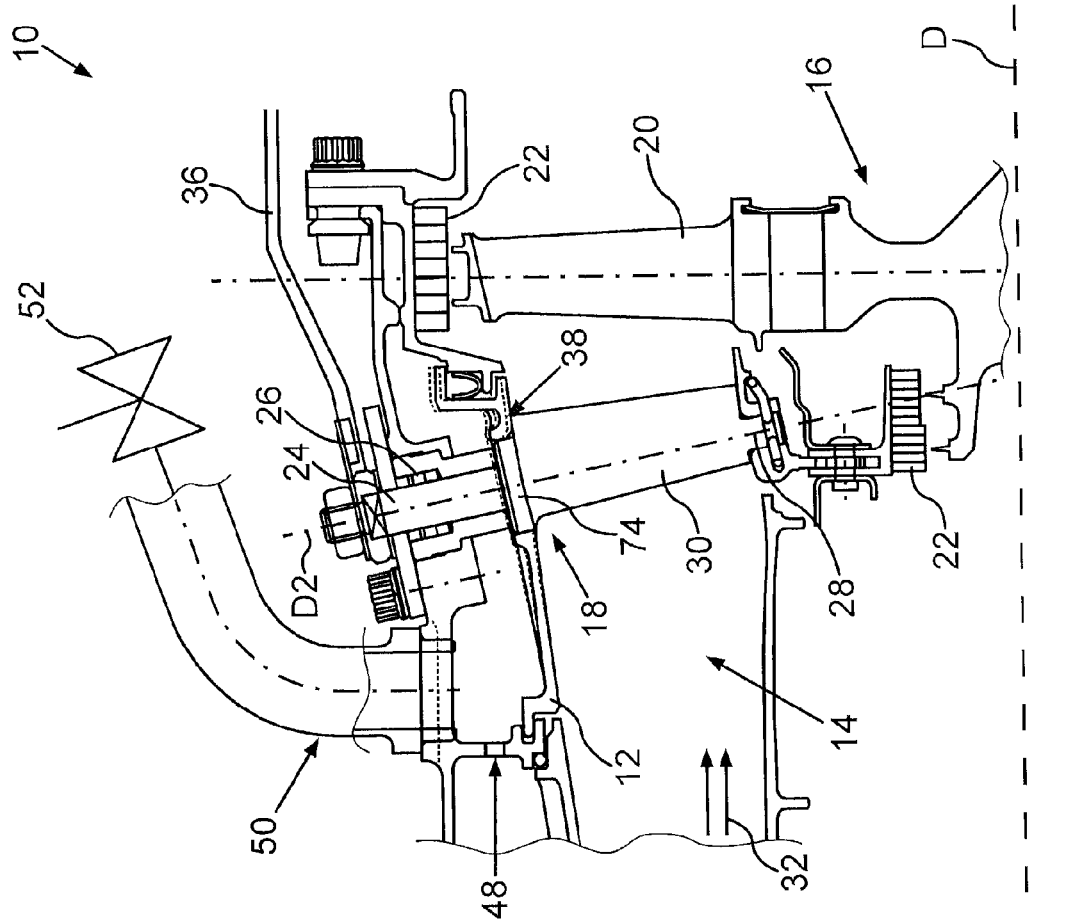
FIG. 1 shows a schematic sectional view through a housing for a gas turbine, which includes at least one movable wall element and at least one variably adjustable guide blade.

FIG. 1 shows a schematic sectional view of a cutout of a housing 10 for a gas turbine. At least one wall element 12 is placed so as to move on the housing 10. This wall element 12 borders a flow channel 14 in the radial direction of a rotational axis D of a rotor 16 of the gas turbine toward the exterior. Furthermore, the housing 10 includes multiple variably adjustable guide blades 18. The representation in FIG. 1 should be understood such that the housing 10 is essentially constructed so as to rotate symmetrically with respect to the rotational axis D.

The gas turbine shown is an aircraft engine, e.g., an engine for an airplane, a helicopter, and unmanned drone, or another flying device. Use in a ship, however, is also conceivable just as is stationery use for power generation. Another exemplary option is the use of the gas turbine to exert pressure on a gas pipeline.

The cutout of the aircraft engine shown in FIG. 1 shows the area of the flow channel 14, which forms the transition from a combustion chamber of the gas turbine to a turbine. A hot flow of gas in this case exits from the combustion chamber, flows through the flow channel 14, and then into the turbine. The gas flow into the flow channel 14 in this case is indicated by the arrow 32 in FIG. 1. This flow of gas expands in the turbine and drives the rotor 16 of the gas turbine. Thus, power is recovered from this flow of gas by the rotor 16. With a gas turbine, this power is used, among other things, to drive a compressor of the gas turbine by one or more shafts. The power recovered from the flow of gas with an aircraft engine can also be used, for example, to drive a fan.

The rotor 16 includes a plurality of annular turbine blades 20 arranged around the rotational axis D. The flow channel 14, which is also characterized as the annular space, is sealed off by a sealing element 22 in both the radial exterior as well as the interior direction of the rotor 16.

In order to ensure optimum flow of the gas through the turbine blades 20, the likewise annular-shaped multiple guide blades 18 arranged around the rotational axis D are variably adjustable. In the example shown, the guide blades 18 with a shaft 24 are housed on the housing 10 so as to rotate in the radial outer direction by a roller bearing 26. On their radially inner end, the guide blades 18 with an additional shaft element 28 are housed so as to rotate on the housing 10. In doing so, it can be seen that one blade leaf 30 of the guide blade 18 is arranged in the flow channel 14. Due to a rotation of the guide blade 18 around its rotational axis D2, an adjustment angle of this blade leaf 30 can be modified with respect to the flow of gas 32 in the flow channel 14. This adjustment of the guide blades 18 is effected in the exemplary embodiment shown using a lever 36 by an adjustment mechanism. Thus, the flow of the turbine blades 20 with the gas can be aerodynamically optimized, whereby the fuel consumption of the gas turbine can be reduced at various operating points.

Figure 2:
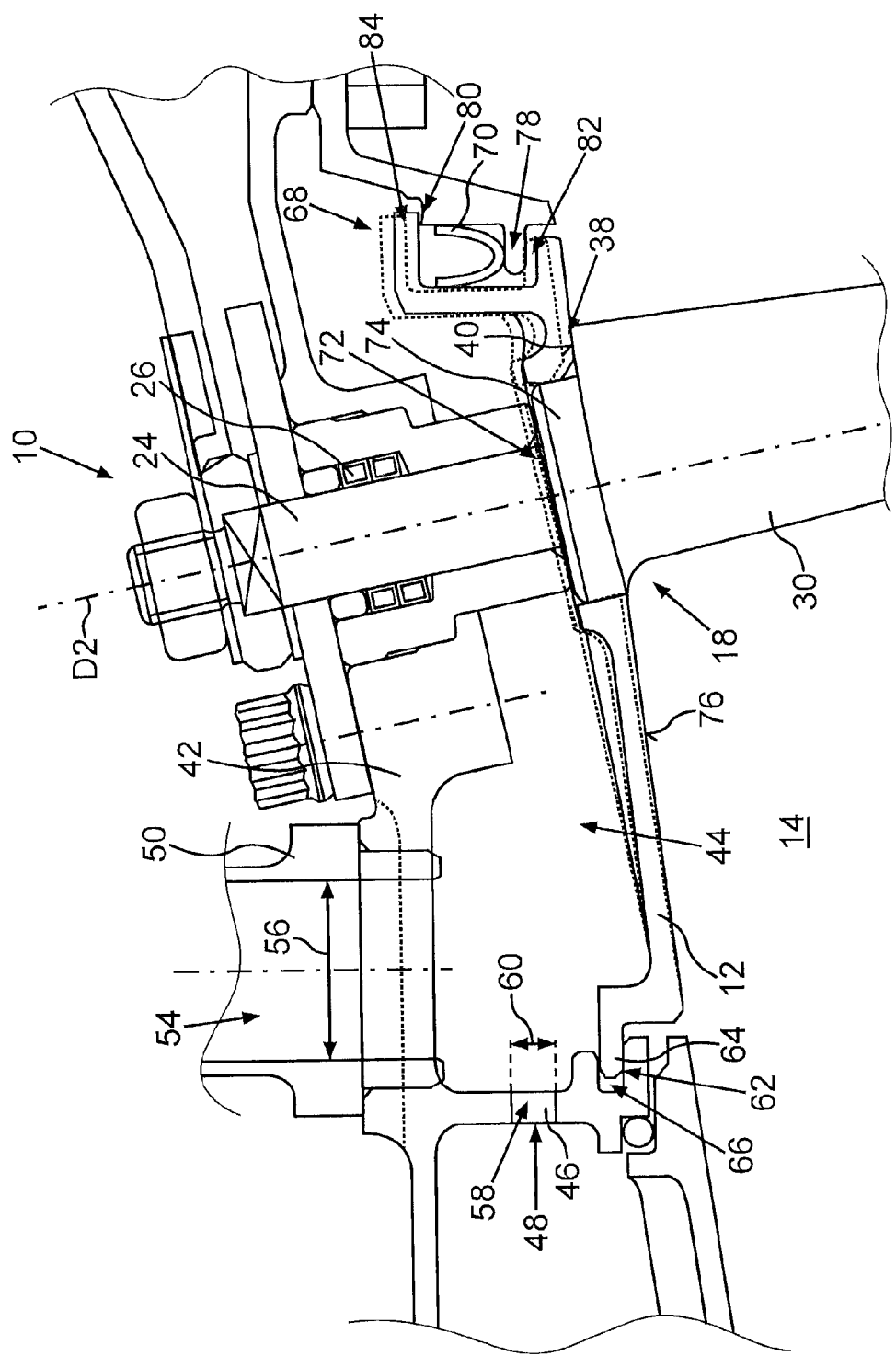
FIG. 2 shows an enlarged detailed view of the housing shown in FIG. 1.

In order to variably adjust the guide blade 18, a gap 38 must be provided between the blade leaf 30 and the wall element 12. This gap 38 is also characterized as the flag gap and can be easily seen in FIG. 2. In order to reduce fuel consumption of the gas turbine, this flag gap 38 should be, or become, closed to the extent possible during operation. Otherwise, strong throttle losses will occur here due to overflow and the inducing of turbulence. Thus, the wall element 12 can be moved between a sealing setting, in which the wall element 12 makes contact at least in a partial area of a side 40 of the blade leaf 30 of the guide blade 18 facing toward the wall element 12, and an open setting, in which the blade leaf 30 and the wall element 12 are spaced apart from one another. The sealing setting of the wall element 12 is shown in FIG. 2 with continuous lines while the open setting is indicated by dashed lines. It can be seen how the wall element 12 makes contact on the side 40 of the blade leaf 30 in the sealing setting, whereby the flag gap 38 is essentially closed.

The wall element 12 can be subjected to pressure for movement between the sealing setting and the open setting. For this purpose, the wall element 12 and an adjoining housing element 42 border a hollow space 44. The hollow space 44 is also characterized as a cavity. This hollow space 44 is supplied with pressure via a pressure supply line 48 formed as a bore hole 46. The pressure can be generated by ram air, which results during the movement of an airplane, helicopter, or the like. Alternatively, bleed air from a compressor stage of the gas turbine can also be used for supplying pressure to the hollow space 44. This pressure in the hollow space 44 exerts an actuating force onto the wall element 12, so that it is moved or pressed against the side 40 of the blade leaf 30. This corresponds to the moving of the wall element 12 into the sealing setting. In other words, it is a pneumatic closing of the flag gap implemented at the variable guide blade 18. The ram or bleed air can preferably simultaneously serve as cooling air for cooling the turbine housing. It can at least partially exit out of the hollow space 44 as leakage flow through remaining openings or gaps into the hot gas or flow channel 14 in order to prevent hot gas from being drawn out of the hot gas or flow channel 14 through the openings or the gaps and into the hollow space 44. Because the wall element 12 according to the present invention is formed so as to move between the sealing setting and the open setting, and the guide blade 18, however, is formed permanently affixed relative to the remaining turbine housing, apart from a possible rotation around its rotational axis D2, a clearance fit is provided with a small annular-shaped gap between the wall element 12 and the guide blade 18. Due to the annular-shaped gap of this clearance fit, a portion of the cooling air can exit, for example, from the hollow space 44 and enter the hot gas or flow channel 14. If necessary however, a sealing element (not shown) can also be provided at this annular gap in order to at least extensively prevent leakage flow.

Furthermore, the housing 10 includes a pressure relief line 50, by which pressure can be reduced in the hollow space 44 by draining off fluid. For example, the pressure relief line 50 can lead into the environment and thus bleed off compressed air in the hollow space 44. When the pressure is reduced in the hollow space 44, the wall element 12 is pressed radially towards the exterior due to the pressure difference between the pressure in the hollow space 44 and the pressure in the flow channel 14, which means that it is moved into the open setting. Alternatively, this movement can also be effected and/or supported by a spring element.

The pressure relief line 50 includes a switchable valve 52, by which the pressure can be controlled or regulated. The switchable valve 52 is only shown by symbols in FIG. 1. Due to a closing of the switchable valve 52, the pressure in the hollow space 44 can be increased in that the compressed air flows through the pressure supply line 48 into the hollow space 44 and cannot escape through the pressure relief line 50 closed by the valve 52. As soon as the pressure in the hollow space 44 exceeds the pressure in the flow channel 14, the wall element 12 moves into the sealing setting. When the switchable valve 52 is opened, the compressed air flows out of the hollow space 44 via the pressure relief line 50. As soon as the pressure in the hollow space 44 becomes less than the pressure in the flow channel 14, the wall element 12 thus moves into the open setting and exposes the flag gap 38, so that the guide blade 18 can be adjusted without there being any wear caused by friction with the wall element 12. With the assistance of the valve 52, the wall element 12 can thus be moved between the sealing setting and the open setting as needed during operation of the gas turbine. Preferably in this case, the pressure in the hollow space 44 is reduced to below the pressure in the flow channel 14 for only a brief time, i.e., less than 10 seconds, or preferably less than 2 seconds, namely essentially only for the time that it takes to adjust the guide blade 18. This will prevent the turbine housing from overheating during this time due to the intake of hot gas and the lack of supply of cooling air.

One can see that a drain-off channel 54 of the pressure relief line 50 has a larger cross-section 56 than an access channel 58 of the pressure supply line. The cross-section of the access channel 58 is identified with reference character 60 in FIG. 2. The larger cross-section 56 of the drain-off channel 54 in this case enables quicker flow-off of the compressed air from the hollow space 44 than can flow through the access channel 58. As an alternative or in addition, the pressure supply line 48 can also of course have a switchable valve.

The pressure supply line 48 or its cross-section 60 is preferably selected to be large enough such that an equilibrium can be set between the supply flow of compressed air into the hollow space 44 and the flow-off through leakage in the housing 10. This means that exactly the amount of compressed air flows when the valve 52 is closed so as to ensure an essentially constant amount of pressure in the hollow space 44, which will retain the wall element 12 in the sealing setting. Thus, the supply of fluid under pressure should be selected such that not enough pressure escapes through leakages from the hollow space 44 such that the wall element 12 unintentionally moves into the open setting. Likewise, there should not be an impermissible increase in the pressure in the hollow space 44. To this end, an overpressure valve or corresponding overpressure limitation can be provided by the valve 52.

Furthermore, it can be seen that the wall element 12 has a bearing 62 on one side on the housing element 42. A nose element 64 of the wall element 12 is inserted into a groove 66 of the housing element 42 for this. In the open setting, the wall element 12 is pivoted or bent radially toward the exterior on its side 68 facing away from the bearing 62 in reference to the flow channel 14. In the sealing setting, the wall element 12 is pivoted or bent, contrary to this, on the side 68 radially in the direction of the flow channel 14. As an alternative, the wall element 12 can also be retained so as to rotate on a joint on the bearing 62.

Furthermore, it can be seen that the wall element 12 at the side 68 facing away from the bearing 62 executes the largest relative movement with respect to the housing element 42 when there is a movement between the sealing setting and the open setting. In this case, a gap is exposed between the wall element 12 and the housing element 42. In order to prevent unnecessary pressure losses in the flow channel 14 here, which could lead to an increase in fuel consumption, and in order to prevent the intake of larger quantities of hot gas into the hollow space 44, a sealing element 70 is arranged at this location. When there is a movement of the wall element 12, it glides along on the sealing element 70.

FIG. 2 also shows that the wall element 12 includes an opening 72, in which a blade disk 74 of the guide blade 18 is arranged. As previously mentioned, a clearance fit, for example in the form of a small annular-shaped gap, is provided between the blade disk 74 the opening 72, which enables a rotation of the guide blade 18 around the rotational axis D2 and extensively reduces pressure losses in the flow channel 14.

A surface 76 of the wall element 12 bordering the flow channel 14 and the blade disk 74 connect flush with one another in the sealing setting. This means that the wall element 12 and the blade disk 74 border the flow channel 14 in the radially external direction with an aerodynamically uniform surface, so that an inducing of turbulence or other undesirable aerodynamic events is prevented in the gas flow in the flow channel 14.

Due to the wall element 12 moved into the sealing setting, the guide blade 18 is fastened to it with friction contact. Thus, the guide blade 18 is retained at the wall element 12 so as to prevent twisting, so that additional elements for fastening the guide blade 18 can be advantageously dispensed with.

Furthermore, it can be seen that a stop element 78 for limiting the movement of the wall element 12 into the open setting as well as a stop element 80 for limiting the movement of the wall element 12 into the sealing setting is provided at the housing 10. The stop element 78 of the housing 10 in this case is formed as a nose element. A corresponding nose element 82 of the wall element 12 is in the open setting at the stop element 78. Thus, it is especially reliably prevented that the wall element 12 be bent too far radially to the exterior due to excessively high pressure difference between the flow channel 14 and the hollow space 44 in the open setting and thereby either be damaged itself or the housing element 42 be damaged. The stop element 80 is formed as an edge in the housing element 42, on which a corresponding nose element 84 of the wall element 12 can come into contact in the sealing setting. This prevents the wall element 12 from being moved or bent too far radially toward the interior. In addition, the blade leaf 30 is also protected from damage caused by excessive movement of the wall element 12.

The gas turbine shown or the aircraft engine shown is operated as follows. As soon as an operating state is present that requires an adjustment of the guide blade 18, the wall element 12 is moved from the sealing setting into the open setting. For this purpose, the switchable valve 52 is opened and compressed air flows out of the hollow space 44 via the pressure relief line 50. Thus, the pressure acting on the wall element 12 is reduced in the hollow space 44. Due to the ruling pressure in the flow channel 14, the wall element 12 is moved or bent into the open setting and thus exposes the flag gap 38.

Thus, the guide blade 18 can be rotated around the rotational axis D2 by the adjustment mechanism until an optimum flow for the turbine blade 20 has been adjusted for the particular operating point. As soon as the guide blade 18 has been adjusted or rotated into the correct position, the switchable valve 52 is again closed. Due to the pressure supply line 48, compressed air flowing into the hollow space 44 exerts pressure on the wall element 12, which acts upon the wall element 12 radially from the exterior out of the hollow space 44. Accordingly, the wall element 12 is moved or bent back into the sealing setting and the flag gap 38 is at least to a large extent closed. Due to the flag gap 38 and optionally other gaps during the adjustment movement of the wall element 12 and the guide blades 18, losses only occur for a brief time, which are negligible for fuel consumption over the entire duration of the flight of the airplane, helicopter, or the like. On the other hand, external losses in the flow channel 14 are practically completely prevented during the remaining operation of the gas turbine or of the aircraft engine, which results in a significant increase in efficiency.

It should be noted, however, that the wall element 12 can be sealed off in other wall elements adjacent it in the circumferential direction, which can be formed identical to the wall element 12, for example by sealing sheets that are not shown and that are provided in corresponding sealing grooves of the wall element 12, as this has been known from the prior art for quite some time. In this manner, a high degree of leak-tightness can be achieved between the wall elements adjacent in the circumferential direction, in both the sealing setting and in the open setting, and during the transition between these settings. Preferably, all of the adjustable guide blades are adjusted simultaneously, so that all of the wall elements 12 assigned to them are transitioned from the sealing setting into the open setting and back again simultaneously.

| List of Reference Characters: | |
|---|---|
| 10 | Housing |
| 12 | Wall element |
| 14 | Flow channel |
| 16 | Rotor |
| 18 | Guide blade |
| 20 | Turbine blade |
| 22 | Sealing element |
| 24 | Shaft |
| 26 | Roller bearing |
| 28 | Shaft element |
| 30 | Blade leaf |
| 32 | Arrows |
| 36 | Lever |
| 38 | Gap |
| 40 | Side |
| 42 | Housing element |
| 44 | Hollow space |
| 46 | Bore hole |
| 48 | Pressure supply line |
| 50 | Pressure relief line |
| 52 | Valve |
| 54 | Drain-off channel |
| 56 | Larger cross-section |
| 58 | Access channel |
| 60 | Smaller cross-section |
| 62 | Bearing |
| 64 | Nose element |
| 66 | Groove |
| 68 | Side |
| 70 | Sealing element |
| 72 | Opening |
| 74 | Blade disk |
| 76 | Surface |
| 78 | Stop element |
| 80 | Stop element |
| 82 | Nose element |
| 84 | Nose element |
| D | Rotor rotational axis |
| D2 | Guide blade rotational axis |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended, claims and equivalents thereof.

What is claimed is:

1. A housing for a gas turbine, comprising:
    a wall element movably disposed on the housing, wherein the wall element limits a flow channel of the housing in a radial direction from a rotational axis of a rotor of the gas turbine; and
    a variably adjustable guide blade which extends through the wall element into the flow channel;
    wherein the wall element defines an opening and wherein a blade disk of the guide blade is disposed in the opening;
    wherein the wall element is movable between a sealing setting in which the wall element makes contact with at least a partial area of a side of a blade leaf of the guide blade facing toward the wall element and an open setting in which the blade leaf and the wall element are spaced apart.

2. The housing according to claim 1, wherein the wall element is movable between the sealing setting and the open setting by a fluid under pressure.

3. The housing according to claim 2, further comprising:
    a pressure supply line, wherein the fluid under pressure is supplyable by the pressure supply line; and
    a pressure relief line, wherein the fluid under pressure is dischargeable by the pressure relief line.

4. The housing according to claim 3, wherein the pressure supply line and/or the pressure relief line includes a valve.

5. The housing according to claim 1, wherein the wall element is retained on a housing element by a bearing.

6. The housing according to claim 1, further comprising a sealing element disposed between the wall element and an adjacent housing element.

7. The housing according to claim 6, wherein the wall element is retained on a housing element by a bearing and wherein the sealing element is arranged on a side of the wall element opposite from the bearing.

8. The housing according to claim 1, wherein a surface of the wall element adjoining the flow channel and the blade disk of the guide blade are essentially connected flush with one another in the sealing setting.

9. The housing according to claim 1, wherein the wall element and the guide blade are fastened to one another with friction contact in the sealing setting.

10. The housing according to claim 1, further comprising a stop element which limits a movement of the wall element into the sealing setting and/or into the open setting.

11. A gas turbine comprising a housing according to claim 1.

12. A method for operating a gas turbine having a housing according to claim 1, comprising the step of:
moving the wall element between the sealing setting and the open setting.

13. The method according to claim 12, further comprising the steps of:
moving the wall element into the open setting;
adjusting the guide blade; and
moving the wall element into the sealing setting.

14. A housing for a gas turbine, comprising:
a wall element movably disposed on the housing, wherein the wall element limits a flow channel of the housing in a radial direction from a rotational axis of a rotor of the gas turbine;
a variably adjustable guide blade which extends through the wall element into the flow channel;
wherein the wall element is movable between a sealing setting in which the wall element makes contact with at least a partial area of a side of a blade leaf of the guide blade facing toward the wall element and an open setting in which the blade leaf and the wall element are spaced apart;
wherein the wall element is movable between the sealing setting and the open setting by a fluid under pressure;
a pressure supply line, wherein the fluid under pressure is supplyable by the pressure supply line; and
a pressure relief line, wherein the fluid under pressure is dischargeable by the pressure relief line;
wherein a drain-off channel of the pressure relief line has a larger cross-section than an access channel of the pressure supply line.

\* \* \* \* \*